United States Patent
Pogorelik et al.

(10) Patent No.: US 10,334,431 B2
(45) Date of Patent: Jun. 25, 2019

(54) NEAR FIELD COMMUNICATIONS (NFC)-BASED OFFLOAD OF NFC OPERATION

(71) Applicant: Intel Corporation, Santa Clara, CA (US)

(72) Inventors: Oleg Pogorelik, Lapid (IL); Shahar Porat, Geva Carmel (IL); Gennady Goltman, Haifa (IL); Sergey Sofer, Rishon Lezion (IL); Alex Nayshtut, Gan Yavne (IL); Avishay Sharaga, Bet Nehemya (IL); Miguel Ballesteros, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 14/580,729

(22) Filed: Dec. 23, 2014

(65) Prior Publication Data

US 2016/0183033 A1 Jun. 23, 2016

(51) Int. Cl.
*H04W 12/04* (2009.01)
*H04L 29/08* (2006.01)
*H04L 29/06* (2006.01)
*H04W 4/80* (2018.01)

(52) U.S. Cl.
CPC ........... *H04W 12/04* (2013.01); *H04L 63/067* (2013.01); *H04L 67/125* (2013.01); *H04L 67/28* (2013.01); *H04L 67/34* (2013.01); *H04W 4/80* (2018.02)

(58) Field of Classification Search
CPC ....... H04W 4/008; H04W 12/04; H04W 4/80; H04L 67/125; H04L 67/28; H04L 67/34; H04L 63/067; H04L 12/1464; H04H 2231/05; H04M 15/751; H04M 2215/7209

USPC .................................. 455/41.1–41.3
See application file for complete search history.

(56) References Cited

U.S. PATENT DOCUMENTS

| | | | |
|---|---|---|---|
| 2009/0023474 A1 | 1/2009 | Luo et al. | |
| 2012/0172026 A1* | 7/2012 | Kwon | H04L 63/067 455/419 |
| 2013/0331027 A1* | 12/2013 | Rose | H04W 12/06 455/41.1 |
| 2014/0236812 A1* | 8/2014 | Capuozzo | G06Q 20/0855 705/39 |
| 2015/0351145 A1* | 12/2015 | Burks | G08C 17/02 455/41.3 |
| 2016/0034887 A1* | 2/2016 | Lee | G09G 5/12 705/39 |

(Continued)

FOREIGN PATENT DOCUMENTS

WO 2013/112839 A1 1/2013

OTHER PUBLICATIONS

Lishoy Francis. Practical Relay Attack on Contactless Transactions by Using NFC Mobile Phones. Information Security Group, Smart Card Centre, Royal Holloway University of London. Oct. 17, 2011. pp. 1-16.*

(Continued)

*Primary Examiner* — Nay A Maung
*Assistant Examiner* — Angelica M Perez
(74) *Attorney, Agent, or Firm* — Schiff Hardin LLP (57) ABSTRACT

Described herein are architectures, platforms and methods for offloading process or application from a near field communication (NFC) master device for proxy delegation to a proxy NFC device.

19 Claims, 8 Drawing Sheets

(56) References Cited

U.S. PATENT DOCUMENTS

2016/0071089 A1* 3/2016 Boivie .............. G06Q 20/3278
705/73

OTHER PUBLICATIONS

Extended European Search Report received for European Patent Application No. 15195505.1, dated Mar. 14, 2016, 10 pages.
SD Association, "Activating New Mobile Services and Business Models with smartSD Memory Cards", White Paper, Nov. 30, 2014, pp. 1-11.
Smart Card Alliance, "Host Card Emulation (HCE) 101", A Smart Card Alliance Mobile & NFC Council White Paper, White Paper, Publication No. MNFCC-14002, Aug. 2014, pp. 1-11.
Office Action received for European Patent Application No. 15195505.1, dated Feb. 17, 2017, 4 pages of European Office Action.
SD Association, "Activating New Mobile Services and Business Models with SmartSD Memory Cards", White Paper, Nov. 2014—enhanced from Sep. 2013, pp. 1-20.

* cited by examiner

NEAR FIELD COMMUNICATIONS (NFC)-BASED OFFLOAD OF NFC OPERATION

BACKGROUND

Near field communication (NFC) is used by devices to conduct various transactions. Examples of such transactions include payment, purchases, unlocking doors, etc. NFC devices are designed to be in close proximity with one another to perform such communications and transactions.

There may be certain situations when an NFC device configured to perform a specific transaction with another NFC device (e.g., NFC reader), is not available to a user. For example, a user may have left his NFC device at home and desires entry through a door that is controlled by an NFC enabled lock. The user needs the NFC device to enter. In another example, a third party, such as relative of the user desires to make a purchase through a transaction with an NFC reader. The third party needs credentials from the user's NFC device to perform the transaction; however, the user can not just simply hand over the user's NFC device to the third party. The third party may have an NFC device, but that NFC device is not properly enabled to perform the transaction.

A typical solution addressing the described issues includes what may be called NFC range extension, which provides for a master NFC device and a proxy NFC device. The master NFC device may provide data/information to the proxy NFC device over a network, such as the Internet, using a bridging tunnel protocol (e.g. https, etc.).

Such solutions may be vulnerable to replay attacks, where another party (e.g., "man in the middle") may steal the transmitted data/information. In other instances, the credentials may be reused by the third party or other parties. Furthermore, that protocols that are used may involve latency between the master NFC device and proxy NFC device, leading to problems of the NFC reader verifying/ using the data/information provided from the master NFC device to the proxy NFC device.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Described herein are architectures, platforms and methods for near field communication (NFC) proxy delegation of an NFC application to a proxy NFC device. An entire NFC process or application may be offloaded from a master NFC device to a trusted proxy NFC device. A one-time NFC transaction may be performed by the proxy NFC device with another NFC device (e.g. NFC reader). The NFC process or application may be erased after the transaction is completed.

Since the entire NFC process or application is offloaded to the proxy NFC device, the proxy NFC device may be able to effectively communicate with the other NFC device (e.g. NFC reader) without latency.

A secure pairing may be performed between master NFC device and proxy NFC device. The master NFC device may verify proxy capabilities of the proxy NFC device after the secure pairing. The verification may make use of a secure key exchange or other security process. A properly identified proxy NFC device receives the NFC process or application.

The NFC process or application may run in a sealed trusted execution environment on the proxy NFC device. The trusted execution environment may erase credentials and all sensitive information immediately after a transaction is completed.

Figure 1:
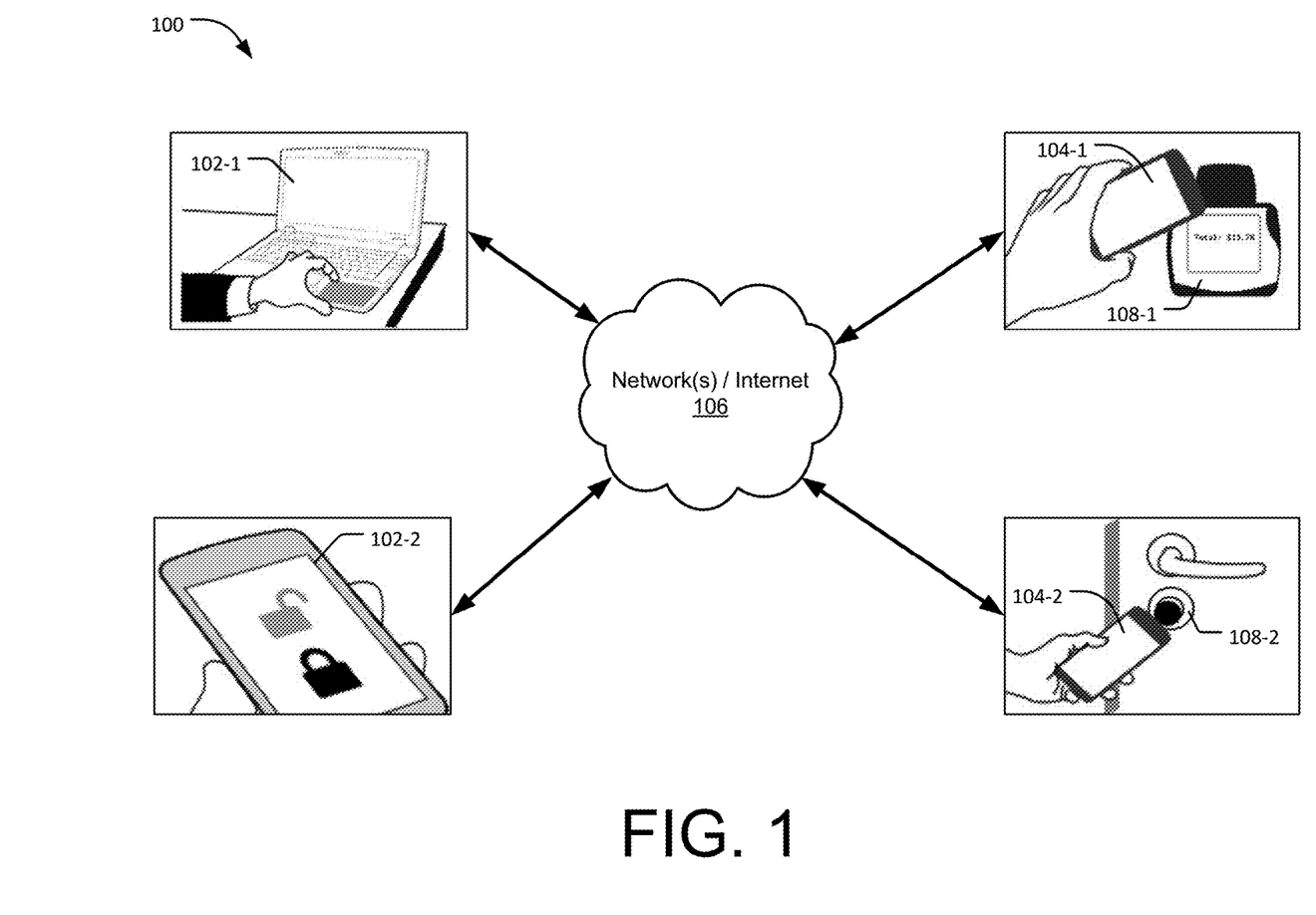
FIG. 1 is an example scenario illustrating transactions between near field communication (NFC) devices for proxy delegation, as described in implementations herein.

FIG. 1 shows an example scenario 100 of transactions between NFC devices for proxy delegation. Scenario 100 includes one or more master NFC devices 102. The master NFC devices 102 communicate one or more proxy NFC devices 104, through one or more networks 106, including the Internet, cellular, and other communication networks.

The master NFC devices 102 are configured with NFC processes or applications used to perform transactions with one or more NFC devices 108. NFC devices 108 may be NFC reader devices that require particular credentials to perform the transactions. Transactions include but are not limited to making purchases (e.g., NFC device 108-1), opening a lock (e.g., NFC device 108-2), etc.

In scenario 100, the master NFC devices 102 are a distance that does not allow communication with NFC devices 108. The proxy NFC devices 104 are in proximity to perform NFC communication with NFC devices 108. To allow the proxy NFC devices 104 to perform particular transactions with NFC devices 108, the master NFC devices 102 provide NFC processes or applications to the NFC devices 108.

The master NFC devices 102, the proxy NFC devices 104, and NFC devices may include, but are not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and any NFC enabled device.

Figure 2:
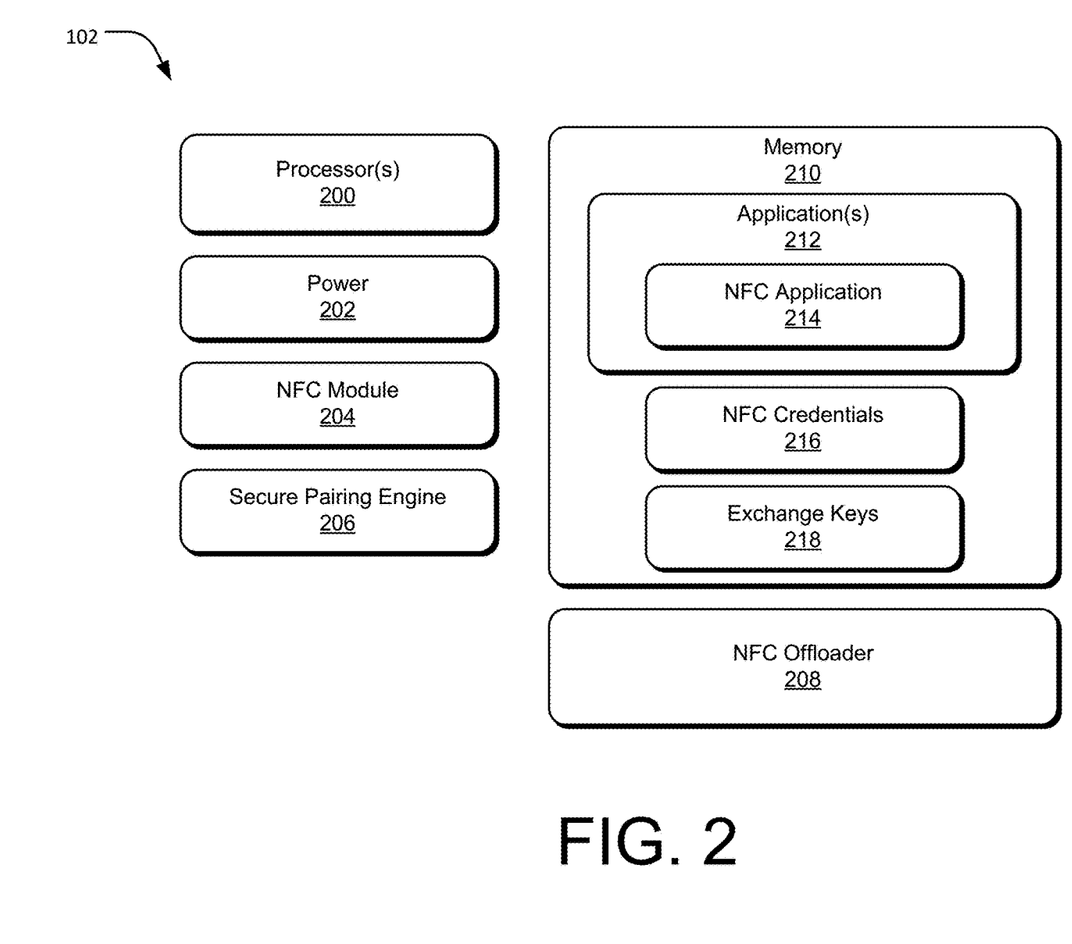
FIG. 2 is an example block diagram illustrating a master near field communication (NFC) device, as described in implementations herein.

FIG. 2 shows an example block diagram of a master NFC device 102. The master NFC device 102 is an NFC capable device authorized for performing NFC operations which has all the necessary NFC credentials in place to perform transactions with another NFC device.

Master NFC device 102 includes one or more processors 200 configured to the other components of master NFC device 102.

The master NFC device 102 includes a power component 202 that may include various AC and/or DC elements, such as batteries. Power component 202 drives and provides power to various other components of the master NFC device 102.

Master NFC device 102 includes an NFC controller or module 204. The NFC module 204 is used to communicate with other NFC enabled devices.

The master NFC device 102 includes a secure pairing engine 206. The secure pairing engine 206 may be used in the provisioning of security keys, for device pairing between other devices, and particularly proxy NFC devices 104. The secure pairing engine 206 may be also used for request attestation/verification and secure data exchange. The secure pairing engine 206 may use an infrastructure, such as PKI (public key infrastructure).

The master NFC device 102 includes an NFC offloader 208 that performs attestation/verification of requests from a paired proxy NFC device 102. After attestation/verification is performed, the NFC offloader 208 may prepare credentials for secure export to the proxy NFC device 104.

The master NFC device 102 includes memory 210. Memory 210 may be non-transitory memory/media that includes various types of storage, including read only, random access and the like. Memory 210 may also include programming/non-programmable firmware. Particular elements described herein as hardware may be implanted as firmware as part of memory 210.

Memory 210 may particularly include various processes and applications 212, including NFC application 214. The NFC application 214 may be a process that is used in transactions with other NFC devices. In particular, NFC application 214 is an application that is communicated to a proxy NFC device 104 to allow the NFC device to transact with the other NFC devices.

Memory 210 may include credentials 216 which, as described above, are created by NFC offloader 208. Memory 210 may also include exchange keys 218. Exchange keys 218 are a set of keys used for attestation/verification of proxy NFC devices 104. The exchange keys 218 are also used for secure data exchange between master NFC device 102 and proxy NFC devices 104. The exchange keys 218 are generated per proxy NFC device 104. Information/data that is encrypted with a key of a specific proxy NFC device 104 cannot be opened on another device.

Figure 3:
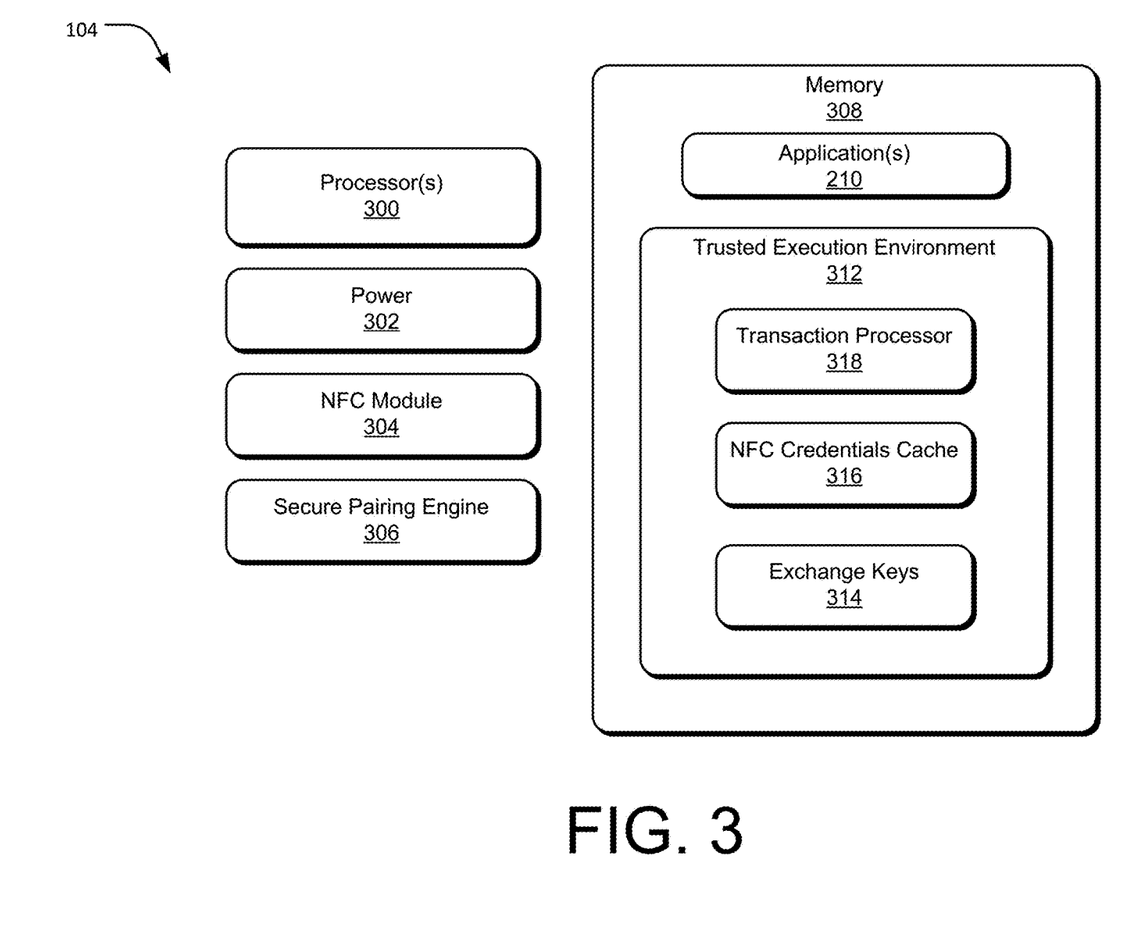
FIG. 3 is an example block diagram illustrating a proxy near field communication (NFC) device, as described in implementations herein.

FIG. 3 shows an example block diagram of a proxy NFC device 104. The proxy NFC device 104 is an NFC capable device that may communicate with other NFC devices. In certain cases, the proxy NFC device 104 is not authorized or lacks specific credentials, to perform particular NFC operations with a specific NFC device or devices, such as an NFC reader; however, the proxy NFC device 104 is in close proximity to such an NFC device or devices.

Proxy NFC device 104 includes one or more processors 300 configured to the other components of proxy NFC device 104.

The proxy NFC device 104 includes a power component 302 that may include various AC and/or DC elements, such as batteries. Power component 302 drives and provides power to various other components of the proxy NFC device 104.

Proxy NFC device 104 includes an NFC controller or module 304. The NFC module 304 is used to communicate with other NFC enabled devices.

The proxy NFC device 104 includes a secure pairing engine 306. The secure pairing engine 306 may be used in the provisioning of security keys, for device pairing between other devices, and particularly master NFC device 102. The secure pairing engine 306 may be also used for request attestation/verification and secure data exchange. The secure pairing engine 306 may use an infrastructure, such as PKI (public key infrastructure).

The proxy NFC device 104 includes memory 308. Memory 308 may be non-transitory memory/media that includes various types of storage, including read only, random access and the like. Memory 308 may also include programming/non-programmable firmware. Particular elements described herein as hardware may be implanted as firmware as part of memory 308.

Memory 308 may particularly include various processes and applications 310, including received NFC process and applications from master NFC device 102. Memory 308 may include a trusted execution environment 312. The trusted execution environment 312 ensures that the running code is executed as specified by the design and isolates both data and code for the time of execution. The trusted execution environment 312 includes and accesses exchange keys 314. Exchange keys 314 are a set of keys used for attestation/verification of proxy NFC device 104. The exchange keys 314 are also used for secure data exchange between master NFC device 102 and proxy NFC device 104. The exchange keys 314 are generated for proxy NFC device 104. Information/data that is encrypted with a key specific to proxy NFC device 104 cannot be opened on another device. The exchange keys 314 are isolated in trusted execution environment 312 so that other applications in proxy NFC device 104 cannot access and use exchange keys 314.

In this example, the trusted execution environment 312 includes an NFC credentials cache 316 to store credentials received from master NFC device 102. The trusted execution environment 314 further includes a trusted NFC transaction processor 318. The trusted NFC transaction processor 318 initiates a remote transaction flow and processing on proxy NFC device 104. Since, trusted NFC transaction processor 318 is running in trusted execution environment 314, instructions are executed as specifically designed. The NFC transaction processor 318 opens credentials from NFC credentials cache 316 in a sealed memory space of trusted execution environment 314, which is inaccessible to an operating system (OS) and other applications of the proxy NFC device 104. The NFC credentials cache 316 is a temporary location in protected memory (i.e., trusted execution environment 314) and used for decryption of encrypted credentials. The decrypted credentials are used during transaction with the particular NFC device. Memory in NFC credentials cache 316 is erased after the transaction. There is no need to keep the credentials outside of the time frame of the transaction and out of the trusted execution environment 314. The NFC transaction processor 318 is configured to remove sensitive information after a transaction is completed or fails, assuring that credentials will not be used by another device or reused by the proxy NFC device 104.

Figure 4:
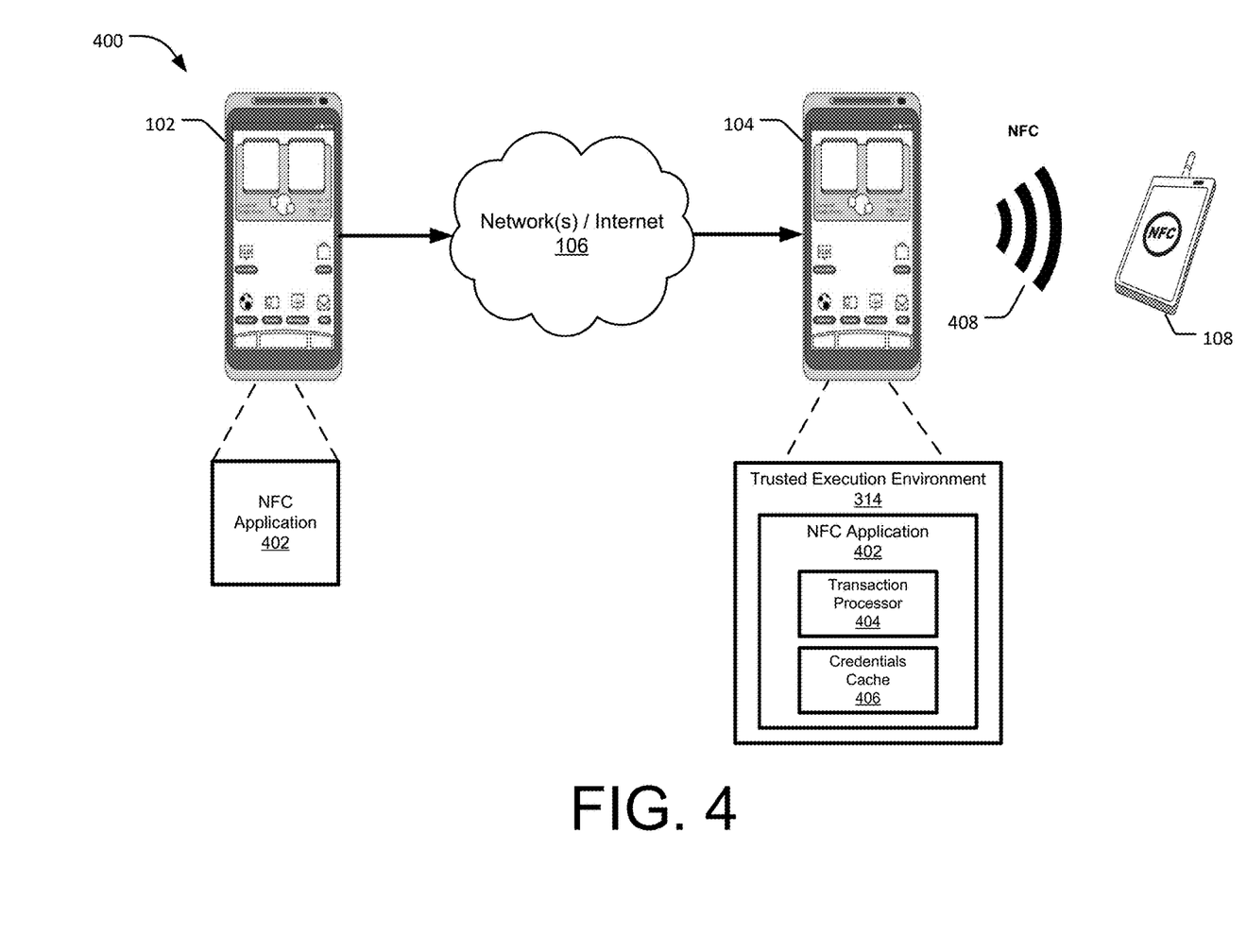
FIG. 4 is an example transaction between near field communication (NFC) devices for proxy delegation, as described in implementations herein.

FIG. 4 shows an example of an execution offload transaction 400 between a master NFC device 102 and a proxy NFC device 104. The execution offload is performed through networks 106.

In this example, an NFC application 402 is offloaded from the master NFC device 102 to the proxy NFC device 104. At proxy NFC device 104 the NFC application 402 is placed in trusted execution environment 314. The NFC application 402 includes a transaction processor 404 and credentials cache 406 (as described above in reference to FIG. 3).

With the NFC application 402, the proxy device 104 is able to transact with an NFC enabled device 108. The transaction is represented by communication 408.

Figure 5:
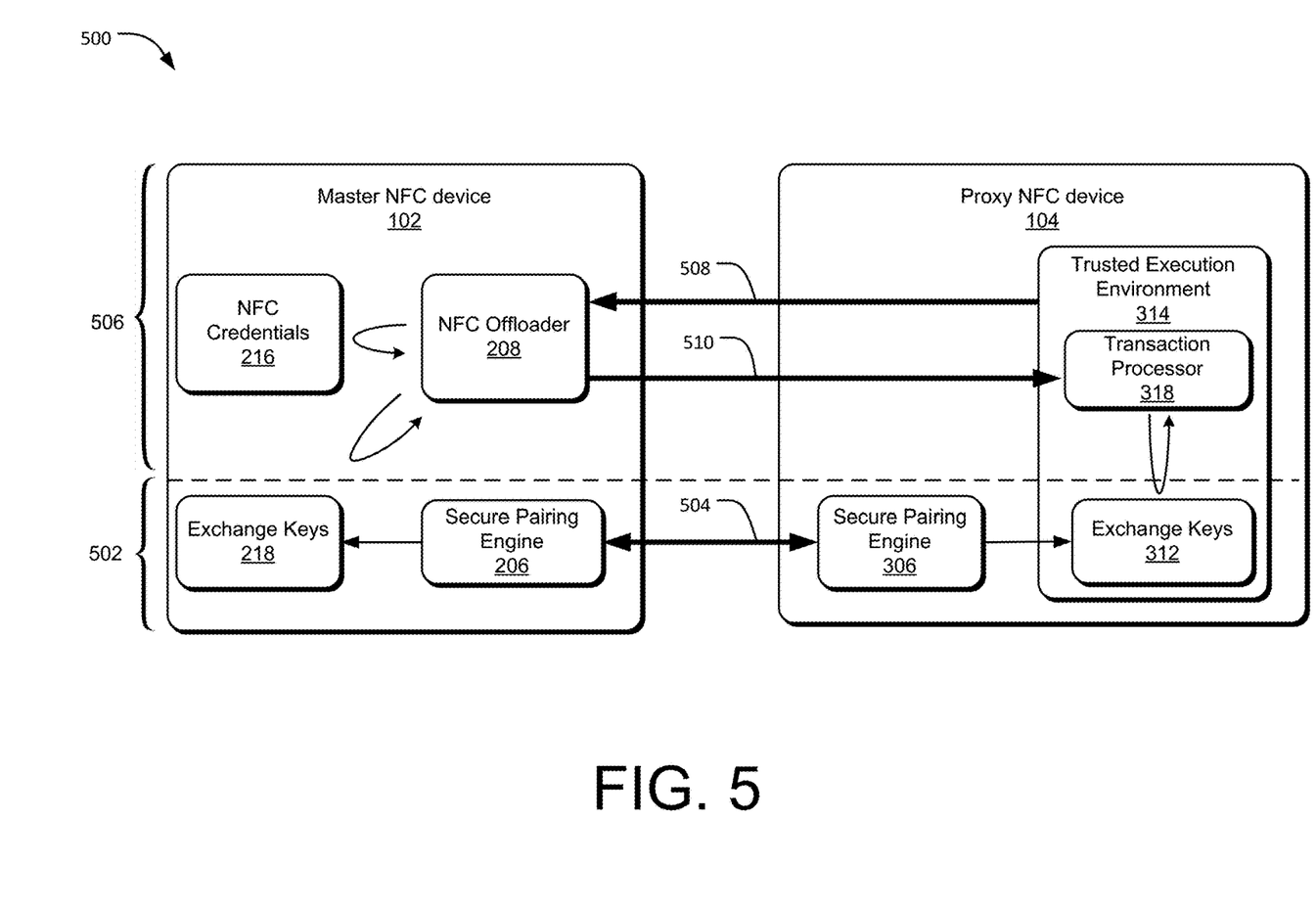
FIG. 5 is an example chart illustrating an example process setting up a transaction between near field communication (NFC) devices for proxy delegation, as described in implementations herein.

FIG. 5 shows a process 500 for setting up a transaction between a master NFC device 102 and a proxy NFC device 104 for proxy delegation. The area set aside by bracket 502 represents secure device pairing between master NFC device 102 and proxy NFC device 104. In particular, a one time device pairing as represented by arrow 504 is performed between the master NFC device 102 and the proxy NFC device 104. In this example, exchange keys 208 and 312 are generated and provisioned by the respective secure pairing engines 206 and 306. In certain implementations, a system such as public key infrastructure or PKI is implemented.

For example, owners of the master NFC device 102 and the proxy NFC device 104 may request to perform the one time device pairing, which initiates a key exchange between the master NFC device 102 and the proxy NFC device 104, enabling further secure data exchange between the devices. Using symmetric PKI may ensure that the data generated by the master NFC device 102 for the proxy NFC device 104, and data generated by the proxy NFC device 104 for the master NFC device 102 cannot be opened/used by other parties and devices.

The area set aside by bracket 506 represents secure transactions between the master NFC device 102 and the proxy NFC device 104. Such secure transactions may include a "transaction request, one time password, etc." as represented by arrow 508, from the proxy NFC device 104 to the master NFC device 102. In turn, "credentials, NFC applications, etc." as represented by arrow 510 may be sent from the master NFC device 102 to the proxy NFC device 104.

As an example, a transaction operation may be initiated by a user of the proxy NFC device 104. After the user enters operation details (e.g., in case of payment, operation details may be a monetary value) as a request that is forwarded (i.e., arrow 508) to master NFC device 102. Such communication may be implemented over typical communication tunnels, such as HTTP. The communicated data is encrypted and signed using the described pairing keys to ensure security, and to enable source identification and attestation. In certain implementations, the data may be signed by an enhanced privacy ID (EPID) signature further proving that the request has been issued by an application from trusted execution environment 314.

After an NFC transaction is approved by an owner/user of master NFC device 102, the required credentials (as represented by arrow 510) will be encrypted using a public key of the appropriate proxy NFC device 104 and forwarded to the proxy NFC device 104 for the further processing. The transaction processor 318 may use a private key which is protected by the trusted execution environment 314 for opening the credentials in the sealed trusted execution environment 314 space.

Transaction with another NFC device is further processed in the trusted execution environment 314. After the NFC transaction, the completed application from the master NFC device 102, will be cleared from the memory of the proxy NFC device 104. In the event of an abort or failure, the application/data may be automatically erased as part of clean up in the trusted execution environment 314.

Figure 6:
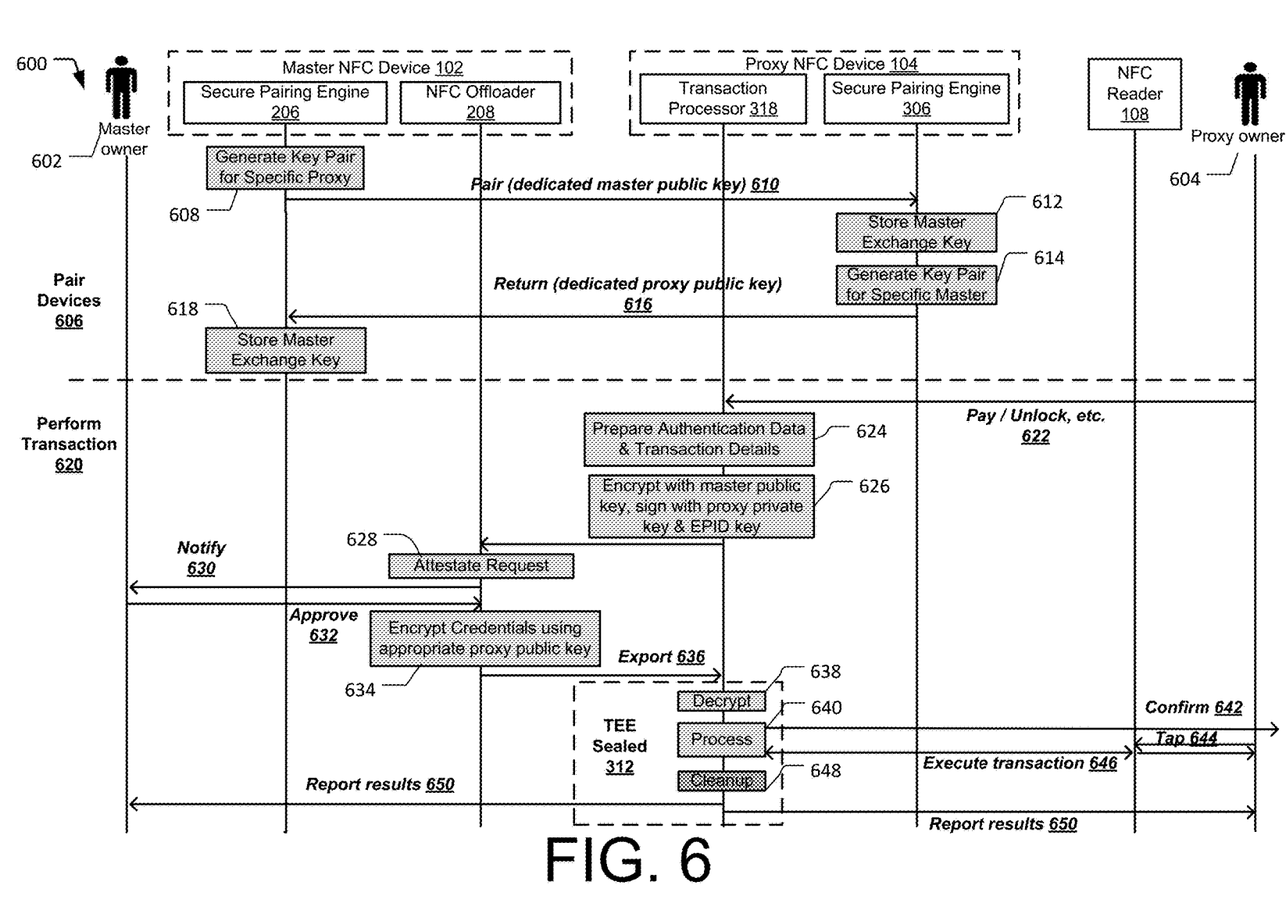
FIG. 6 is an example chart of an overall process for setting up a transaction between near field communication (NFC) devices for proxy delegation, as described in implementations herein.

FIG. 6 shows an example overall process chart 600. Chart 600 shows described elements discussed above. Example interactions as discussed are further shown by chart 600. Chart 600 shows example actions and interactions as to the previously described users, devices, and components.

A master NFC device owner 602 of master NFC device 102 may communicate with a proxy NFC device owner 604 of proxy NFC device 104. A pairing of master NFC device 102 and proxy NFC device 104 may take place as represented by pair devices 606. During this pair device stage 606, a key pair is generated for the specific proxy NFC device 102, as represented by block 608. The secure pairing engine 206 may generate the key pair. The key pair with dedicated master public key 610 is sent to secure pairing engine 306.

The secure pairing engine 306 stores the master key/exchange key as represented by block 612. The secure pairing engine 306 generates a key pair that is specific to the master NFC device 102 as represented by block 614. A dedicated proxy public key is returned to the mater at line 616. The master NFC device 102 through security pairing engine 206 stores the master exchange key as represented by block 618.

After the secure pairing stage 606, a one time transaction may be performed between proxy NFC device 104 and NFC reader 108 as represented by perform transaction 620. The proxy NFC device owner 604 may desire a particular transaction 622. The transaction 622 is sent to transaction processor 318 which prepares authentication data and transactions details 624, and encrypts the authentication data and transactions details with a master public key, signs with a proxy private key and enhanced privacy ID (EPID) 626. The encrypted data is sent to the NFC offloader 208, which attestates/verifies the request 628. A notification 628 is then sent to the master NFC device owner 602.

The master NFC device owner 602 may approve the request 632. The NFC offloader 208 encrypts credentials (and other data) using the appropriate proxy public key for proxy NFC device 104, as represented by 634. Encrypted credentials (data) are exported 636 to transaction processor 318. Within sealed trusted execution environment (TEE) 312, the transaction processor 318, decrypts 638 the credentials (data), processes 640 a confirmation to proxy NFC device owner 604. The proxy NFC device owner 604 may tap 644 the NFC reader 108 to initiate the transaction. The transaction is executed 646 by the NFC reader and the transaction processor 318. Cleanup 648 may be performed by the transaction processor 318 after the one time transaction occurs, fails or is aborted. Results 650 of the transaction may be reported to the master NFC device owner 602 and the proxy NFC device owner 604.

Figure 7:
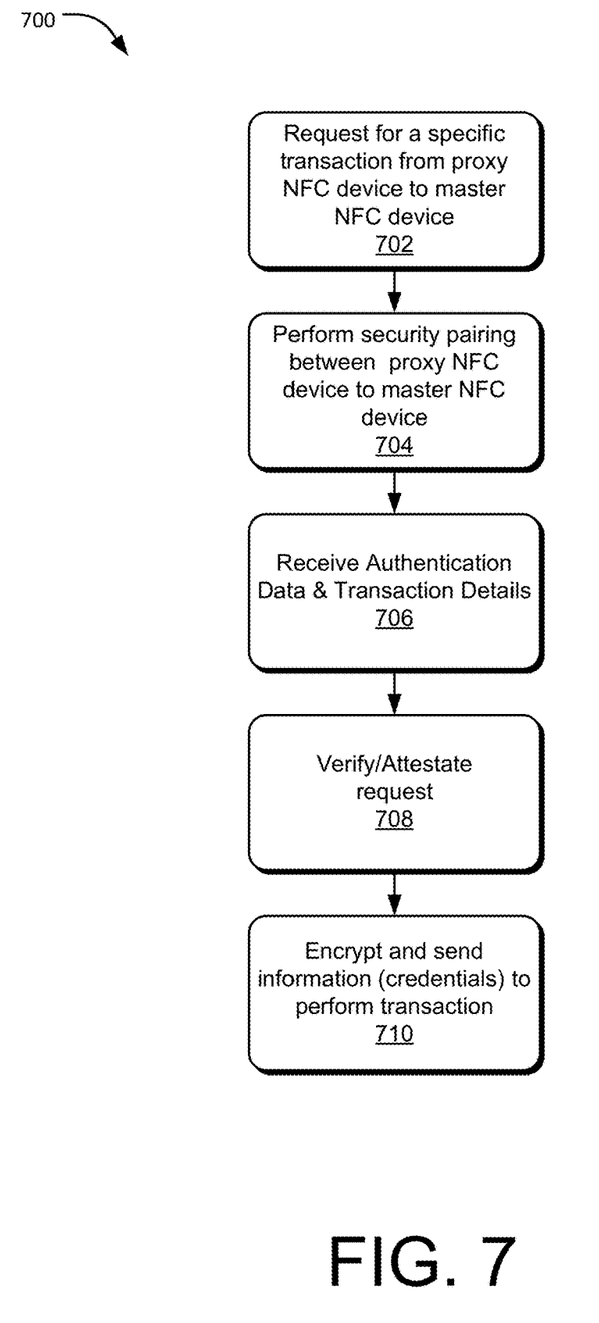
FIG. 7 is an example chart illustrating an example process flow for transaction between near field communication (NFC) devices for proxy delegation as performed at a master near filed communication (NFC) device, as described in implementations herein.

FIG. 7 shows an example process flow 700 illustrating an example method for process flow for transaction between near field communication (NFC) devices for proxy delegation. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention. For example, a master NFC device may perform the flow 700.

At block 702, a specific transaction is received. This may be a one time transaction to be performed between the proxy NFC device and an NFC device, such as an NFC reader. A master NFC device has the credentials/application that is needed for the proxy NFC device to perform the transaction with the other NFC device. For example, the specific transaction, may be conducting a purchase/payment, opening a lock, etc.

At block 704, security pairing is performed. The master NFC device and the proxy NFC device may perform a security key exchange for keys to be used between the master NFC device and the proxy NFC device. The master NFC device and the proxy NFC device may use security pairing engines as described above. For example, the master NFC device may generate a key pair for the proxy NFC device and send the key, including a master public key to the proxy device. The proxy NFC device stores the received key pair and generates a key pair for the master NFC device. The keys are used for secure transmission of the credentials/information needed for the transaction of block 702.

At block 706, authentication data and transaction details are received. As examples of transaction, a user of the proxy NFC device may request for a specific sum of money if the transaction is a payment or purchase, or request an NFC enabled lock to be unlocked. The proxy NFC device prepares such details, along with authentication data of the proxy NFC device to be sent to the master NFC device. The authentication data and transaction details may be encrypted with a master public key, signed with proxy private key and an enhanced privacy ID (EPID) key, and sent to the master NFC device.

At block 708, verifying and attesting is performed. The master NFC device verifies the authentication and transaction details from the proxy NFC device. The verification and attestation includes verifying the proxy NFC device. A user of the master NFC device may be notified of the transaction request from the proxy NFC device. The user of the master NFC device may approve or disapprove the transaction request. If approved, the credentials/application and any necessary data are sent.

At block 710, encrypting and sending information is performed. The information includes credentials, applications, and all necessary data that may be needed by the proxy NFC device to perform the transaction with the other NFC device (i.e., NFC reader). The encryption may be performed using a public key of the proxy NFC device.

Figure 8:
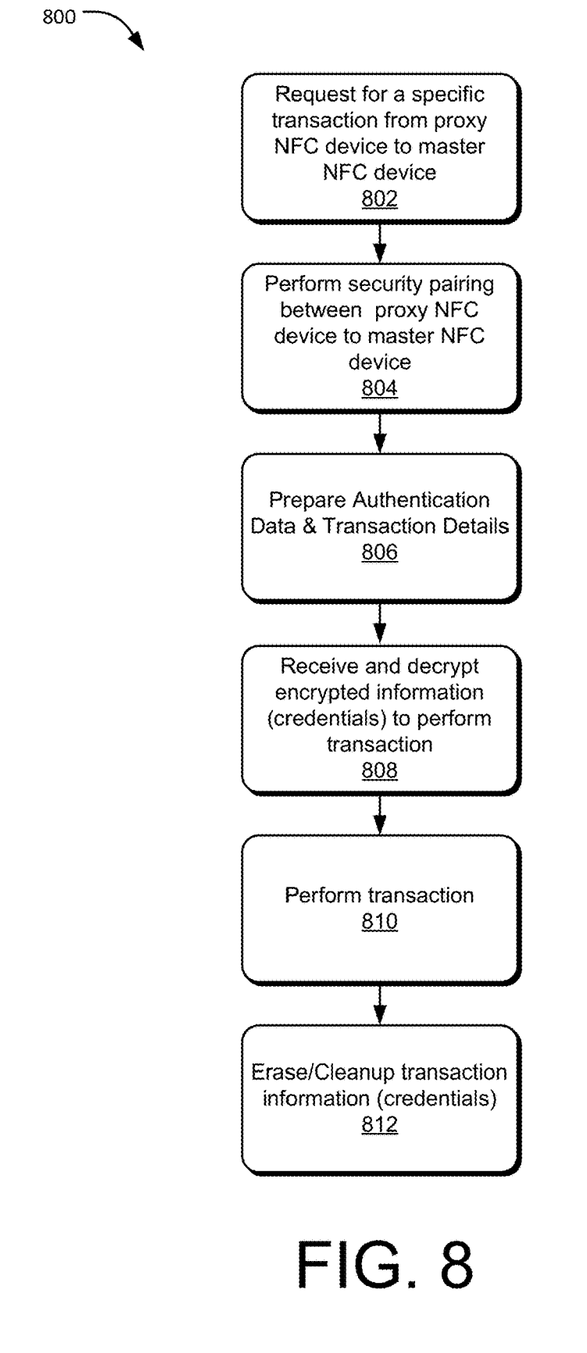
FIG. 8 is an example chart illustrating an example process flow for transaction between near field communication (NFC) devices for proxy delegation as performed at a proxy near filed communication (NFC) device, as described in implementations herein.

FIG. 8 shows an example process flow 800 illustrating an example method for process flow for transaction between near field communication (NFC) devices for proxy delegation. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention. For example, a proxy NFC device may perform the flow 800.

At block 802, a specific transaction request is sent. This may be a one time transaction to be performed between the proxy NFC device and an NFC device, such as an NFC reader. A master NFC device has the credentials/application that is needed for the proxy NFC device to perform the transaction with the other NFC device. For example, the specific transaction, may be conducting a purchase/payment, opening a lock, etc.

At block 804, security pairing is performed. The master NFC device and the proxy NFC device may perform a security key exchange for keys to be used between the master NFC device and the proxy NFC device. The master NFC device and the proxy NFC device may use security pairing engines as described above. For example, the master NFC device may generate a key pair for the proxy NFC device and send the key, including a master public key to the proxy device. The proxy NFC device stores the received key pair and generates a key pair for the master NFC device. The keys are used for secure transmission of the credentials/information needed for the transaction of block 702.

At block 806, authentication data and transaction details are sent. As examples of transaction, a user of the proxy NFC device may request for a specific sum of money if the transaction is a payment or purchase, or request an NFC enabled lock to be unlocked. The proxy NFC device prepares such details, along with authentication data of the proxy NFC device to be sent to the master NFC device. The authentication data and transaction details may be encrypted with a master public key, signed with proxy private key and an enhanced privacy ID (EPID) key, and sent to the master NFC device.

At block 808, encrypted information (credentials) is received and decrypted. The information includes credentials, applications, and all necessary data that may be needed by the proxy NFC device to perform the transaction with the other NFC device (i.e., NFC reader). The decryption may be performed using key pairs. The sealed trusted execution environment may decrypt and process the credentials, applications, and all necessary data, and process the transaction with the other NFC device (i.e., NFC reader).

At block 810, the transaction is performed with another NFC device, such as an NFC reader. The credentials, applications, and all necessary data and downloaded to a sealed trusted execution environment of the proxy NFC device.

At block 812, cleanup is performed by the proxy NFC device. Since the transaction is a one time event, in order to prevent reuse by the proxy NFC device or any other devices, the credentials, applications, and all necessary data are deleted from the proxy NFC device.

The following examples pertain to further embodiments:

Example 1 is a near field communication (NFC) device comprising: one or more processors; a memory coupled to the one or more processors comprised of an application and information used by a remote proxy NFC device to perform a one time transaction with a third NFC device; and an offloader coupled to the one or more processors and memory configured to send the application and information to the proxy NFC device.

In Example 2, the NFC device of Example 1, wherein the NFC device and remote proxy NFC device are configured to perform a secure pairing before the one time transaction.

In Example 3, the NFC device of Example 1, wherein the offloader is configure to attestate requests for the one time transaction from the remote proxy NFC device.

In Example 4, the NFC device of Example 1, wherein the offloader performs encryption on the application and information before it is sent to the remote proxy NFC device.

In Example 5, the NFC device of Example 1 further comprising a secure paring engine to perform secured communication between the NFC device and the remote proxy NFC device.

In Example 6, the NFC device of any of Examples 1 to 4, wherein the information includes credentials to perform the one time transaction.

In Example 7, the NFC device of any of Examples 1 to 4, wherein the application and information include all data to perform the one time transaction and are sent at one time to the remote proxy NFC device.

In Example 8, the NFC device of any of Examples 1 to 4, wherein the application and information are encrypted for use solely by the proxy NFC device.

Example 9 is a near field communication (NFC) device comprising: one or more processors; and a memory coupled to the processors comprised of a trusted execution environment configured to receive an application and information used to perform a one time transaction with a third NFC device from a master NFC device, and process the application and information for transacting with the third NFC device.

In Example 10, the NFC device of Example 9, wherein the trusted execution environment is comprised an NFC credential cache of received credentials from the master NFC device used to perform the one time transaction, wherein the NFC cache is inaccessible to an operating system and other applications of the NFC device.

In Example 11, the NFC device of Example 9, wherein the trusted execution environment is comprised of a transaction processor configured to receive credentials from the master NFC device used to perform the one time transaction.

In Example 12, the NFC device of Example 9, wherein the trusted execution environment is comprised of a transaction processor configured to provide transaction details of the one time transaction.

In Example 13, the NFC device of Example 12, wherein the transaction details are encrypted with a master public key, signed with proxy private key and an enhanced privacy ID (EPID) key.

In Example 14, the NFC device of Example 9 further comprising a secure paring engine to perform secured communication between the NFC device and the master NFC device.

In Example 15, the NFC device of any of Examples 9 to 14, wherein the trusted execution environment is comprised of a transaction processor configured to delete the application and information when the one time transaction is completed.

In Example 16, the NFC device of any of Examples 9 to 14, wherein the application and information received by trusted execution environment receives is encrypted, and the trusted execution environment decrypts the application and information Example 17 is a method of near field communications (NFC) proxy delegation comprising: receiving a request for a one time transaction between a proxy NFC device and an NFC reader device; performing security pairing of the proxy NFC device with a master NFC device, wherein the master NFC devices comprises a process and information needed for the one time transaction; sending encrypted process and information to the proxy NFC device; decrypting and processing the one time transaction.

In Example 18, the method of Example 17, wherein the security pairing is performed using a public key infrastructure.

In Example 19, the method of Example 17 further comprising verifying a request from the proxy NFC device.

In Example 20, the method of any of Examples 17 to 19 further comprising erasing the process and information when the one time transaction is completed.

What is claimed is:

1. A master near field communication (NFC) device comprising:
    one or more processors;
    a memory coupled to the one or more processors, the memory configured to store an NFC application that facilitates an NFC monetary transaction between the master NFC device and a reader NFC device through NFC communication between a remote proxy NFC device and the reader NFC device, wherein the NFC monetary transaction includes payment or purchase;
    a security pairing engine configured to pair the master NFC device and the remote proxy NFC device by sending a dedicated master public key to the remote proxy NFC device, the security pairing engine being further configured to receive a dedicated proxy public key from the remote proxy NFC device to thereby establish the remote proxy NFC device as a trusted proxy NFC device for NFC application offloading; and
    an offloader configured to (i) receive a request from the trusted remote proxy NFC device to perform a NFC monetary transaction with the reader NFC device, (ii) upon approving the request, encrypt credentials and data using the dedicated proxy public key, (iii) send the encrypted credentials and data to the trusted remote proxy NFC device as an approval for the trusted remote proxy NFC device to perform the NFC monetary transaction with the reader NFC device, and (iv) send the NFC application to the trusted remote proxy NFC device to facilitate the NFC monetary transaction.

2. The master NFC device of claim 1, wherein the request to perform the NFC monetary transaction received from the trusted remote proxy NFC device is encrypted using the dedicated master public key.

3. The master NFC device of claim 1, wherein the security pairing engine is configured to facilitate storing of the dedicated master public key to the memory.

4. The master NFC device of claim 1, wherein the credentials and data are encrypted for use solely by the trusted remote proxy NFC device.

5. The master NFC device of claim 1, wherein the reader NFC device cannot decrypt the encrypted credentials and data using the dedicated proxy public key.

6. The master NFC device of claim 1, wherein the request to perform the NFC monetary transaction received from the trusted remote proxy NFC device includes authentication data and transactions details associated with the NFC monetary transaction, the authentication data and transactions details being encrypted using the dedicated master public key and signed with a proxy private key and an enhanced privacy ID (EPID), the signature of the proxy private key and the EPID proving that the request was issued via a trusted execution environment associated with the trusted remote proxy NFC device.

7. A proxy near field communication (NFC) device comprising:
    an NFC module configured to perform NFC communications for the proxy NFC device;
    one or more processors coupled to the NFC module; and
    a memory coupled to the one or more processors comprised of a trusted execution environment that is configured to be isolated from access by an operating system or applications running on the proxy NFC device outside the trusted execution environment, the trusted execution environment being further configured to:

send a request to a master NFC device to perform a NFC monetary transaction with a reader NFC device, the request including data indicating that the request originated via the trusted execution environment associated with the proxy NFC device;

upon approval of the request via the master NFC device, receive an NFC application and credentials from the master NFC device over via NFC communications; and in response to receiving the NFC application and credentials, executing the NFC application using the received credentials to perform the NFC monetary transaction between the master NFC device and the reader NFC device via NFC communication between the proxy NFC device and the reader NFC device.

8. The proxy NFC device of claim 7, wherein the trusted execution environment is configured to delete a received application that facilitates execution of the NFC monetary transaction between the proxy NFC device and the reader NFC device when the NFC monetary transaction is completed.

9. The proxy NFC device of claim 7, wherein the NFC application, when executed by the one or more processors of the proxy NFC device, is further configured to provide the encrypted transaction details of the NFC monetary transaction as part of the request to perform the NFC monetary transaction.

10. The proxy NFC device of claim 9, wherein the data indicating that the request originated via the trusted execution includes transaction details signed with a proxy private key and an enhanced privacy ID (EPID) key associated with the proxy NFC device.

11. The proxy NFC device of claim 7, further comprising:
a secure pairing engine that is configured to perform secured communication between the proxy NFC device and the master NFC device.

12. A method for delegating a near field communications (NFC) proxy, comprising:
sending a request from a proxy NFC device to a master NFC device for a NFC transaction between the master NFC device and a reader NFC device through NFC communication between the proxy NFC device and the reader NFC device, the request including data indicating that the request originated via a trusted execution environment, the trusted execution environment being configured to be isolated from access by an operating system or applications running on the proxy NFC device outside the trusted execution environment;

receiving encrypted credentials and an NFC application from the master NFC device after the request has been approved via the master NFC device, wherein the encrypted credentials and the NFC application enable performance of NFC transaction; and in response to the received encrypted credentials and the NFC application, performing the NFC transaction.

13. The method of claim 12, wherein the NFC transaction includes a payment or purchase.

14. The method of claim 12 wherein the NFC transaction includes opening a lock.

15. The method of claim 12 further comprising:
erasing the encrypted credentials that enable the NFC transaction after the NFC transaction is completed.

16. A master near field communication (NFC) device, comprising:
a processor;
a memory coupled to the processor, the memory being configured to store an NFC application configured to facilitate a NFC transaction between the master NFC device and a reader NFC device via a remote proxy NFC device; and
a NFC application offloader configured to send the NFC application to the remote proxy NFC device for performing the NFC transaction with the reader NFC device, the NFC application causing the remote proxy NFC device to (i) receive a request for the NFC transaction from a user of the NFC proxy device, (ii) send a notification of the request to the master NFC device, and (iii) in response to received authorization from the master NFC device, perform the NFC transaction between the master NFC device and the reader NFC device.

17. The master NFC device of claim 16, wherein the NFC transaction is a one-time NFC transaction.

18. The master NFC device of claim 16, wherein the NFC application offloader is further configured to send credentials to the remote proxy NFC device for performing the NFC transaction with the reader NFC device.

19. The master NFC device of claim 16, wherein the NFC application offloader is further configured to send credentials to the remote proxy NFC device to enable the NFC transaction, and the NFC application is further configured to erase the credentials after the NFC transaction is completed.

* * * * *